United States Patent
Funabashi (10) Patent No.: US 6,736,259 B1
(45) Date of Patent: May 18, 2004

(54) CHAIN FOR THREE-DIMENSIONAL TRANSFER LINE

(75) Inventor: Masao Funabashi, Tokyo (JP)

(73) Assignee: Yamakyu Chain Co., Ltd., Tokyo (JP)

( * ) Notice: Subject to any disclaimer, the term of this patent is extended or adjusted under 35 U.S.C. 154(b) by 483 days.

(21) Appl. No.: 10/088,492

(22) PCT Filed: Nov. 14, 2000

(86) PCT No.: PCT/JP00/08013

§ 371 (c)(1),
(2), (4) Date: Mar. 27, 2002

(87) PCT Pub. No.: WO01/36304

PCT Pub. Date: May 25, 2001

(30) Foreign Application Priority Data

Nov. 16, 1999  (JP) .................................. 11-325177

(51) Int. Cl.[7] .............................................. B65G 17/06
(52) U.S. Cl. ...................................... 198/852; 198/853
(58) Field of Search .................................. 198/852, 853

(56) References Cited

U.S. PATENT DOCUMENTS

| | | | |
|---|---|---|---|
| 4,682,687 A | * | 7/1987 | Leege et al. ................ 198/852 |
| 4,895,248 A | * | 1/1990 | Wahren ....................... 198/852 |

(List continued on next page.)

FOREIGN PATENT DOCUMENTS

| | | |
|---|---|---|
| JP | 50-51389 | 5/1975 |
| JP | 53-51592 | 12/1978 |
| JP | 5-95914 | 12/1993 |
| JP | 6-345232 | 12/1994 |
| JP | 7-61550 | 3/1995 |
| JP | 7-97022 | 4/1995 |
| JP | 2622936 | 4/1997 |
| JP | 2605451 | 5/2000 |
| JP | 55-53525 | 5/2000 |

OTHER PUBLICATIONS

English Language Abstract of JP 50–51389.
English Language Abstract of JP 2622936.

(List continued on next page.)

*Primary Examiner*—Christopher P. Ellis
*Assistant Examiner*—Rashmi Sharma
(74) *Attorney, Agent, or Firm*—Greenblum & Bernstein, P.L.C.

(57) ABSTRACT

The present invention provides a chain for use in a three-dimensional conveyor line, formed from synthetic resin-made chain links A connected endlessly to each other by a shaft pin C. The chain link A includes a top plate part A2 on which a product to be conveyed is placed, and a link part A1 formed under the top plate part to couple two adjacent chain links to each other and which includes a projecting head portion 1 and a pair of leg pieces 2. The upper surface of the projecting head portion 1 is formed circular nearly along a circle whose center lies on the longitudinal axis of the shaft pin C and smoothly contiguous to the upper surface of the top plate part A2. The length of the top plate part A2 in the conveying direction is set shorter than the chain pitch. The top plate part A2 has a lower slant face 11 formed on the front edge thereof, and also formed on the central rear edge thereof a curved concavity 7 with a concave slant face 7a. Owing to the above construction, even if an opening takes place between the top plate parts of the two adjacent chain links, the projecting head portion can be prevented from making a large step so that products can smoothly be conveyed without being thrust up, caught or overturned. Thus, the chain links can be moved largely and smoothly in relation to each other without interference with each other to provide a wider conveying or supporting surface for the products which are to be conveyed. Namely, the conveyor chain according to the present invention permits to provide a three-dimensional conveyor line simply constructed, easy to manufacture, suitable for mass production, highly durable and very inexpensive.

5 Claims, 11 Drawing Sheets

U.S. PATENT DOCUMENTS

| | | | | |
|---|---|---|---|---|
| 5,375,697 A | * | 12/1994 | Battati et al. | 198/852 |
| 5,402,880 A | * | 4/1995 | Murphy | 198/852 |
| 5,404,997 A | * | 4/1995 | Schreier et al. | 198/779 |
| 5,697,492 A | * | 12/1997 | Damkjaer | 198/852 |
| 5,803,236 A | * | 9/1998 | Wahren | 198/852 |
| 6,247,583 B1 | * | 6/2001 | Coen et al. | 198/852 |
| 6,250,459 B1 | * | 6/2001 | Coen et al. | 198/852 |
| 6,253,911 B1 | * | 7/2001 | Layne et al. | 198/852 |
| 6,347,699 B1 | * | 2/2002 | Ramsey | 198/852 |
| 6,360,868 B1 | * | 3/2002 | Arlt et al. | 198/370.06 |
| 6,364,094 B1 | * | 4/2002 | Alstmar | 198/852 |

OTHER PUBLICATIONS

English Language Abstract of JP 5–95914.
English Language Abstract of JP 6–345232.
English Language Abstract of JP 53–51592.
English Language Abstract of JP 7–61550.
English Language Abstract of JP 7–97022.
English Language Abstract of JP 2605451.
English Language Abstract of JP 55–53525.

* cited by examiner

CHAIN FOR THREE-DIMENSIONAL TRANSFER LINE

FIELD OF THE INVENTION

The present invention relates to a chain for a three-dimensional conveyor line used to three-dimensionally convey products such as beverages, foods, pharmaceuticals or the like.

BACKGROUND ART

As the conveyor chain of this type, there have been proposed for example the conveyor-belt chain link disclosed in the Japanese Published Utility Model Application No. 51389 of 1975 and the conveyor unit disclosed in the Japanese Patent No. 2622936.

Many of the above-mentioned conventional conveyor chains for use in the three-dimensional conveyor lines are disadvantageous in that they cannot provide any relatively wide conveying or supporting surface for the products which are to be conveyed because they are limited in lateral movement relative to each other. Also, of the chains having a relatively wide conveying surface, many have both the conveying-directional edges thereof projected back and forth from the shaft pin hinging the two adjacent chain links to each other. While a product is being conveyed obliquely or when the chain engages onto the sprocket, the projecting chain edges are likely to thrust up the product or make a large step between the conveying surfaces, so that the product will possibly be overturned or caught (or stalled).

The present invention has an object to overcome the above-mentioned drawbacks of the prior art by providing a chain for use in a three-dimensional conveyor line, adapted to convey products more smoothly.

DISCLOSURE OF THE INVENTION (1) A chain for use in a three-dimensional conveyor line, according to the present invention comprises synthetic resin-made chain links endlessly connected together and of which two adjacent ones are hinged to each other by a shaft pin as set forth in claim 1, wherein:

each of the chain links includes a top plate part on which a product to be conveyed is placed, and a link part formed under the top plate part to hinge two adjacent chain links to each other;

the link part includes a head portion projecting frontward from the central front end of the top plate part and a pair of leg pieces projecting rearward from the right and left rear ends, separated from each other, of the top plate part;

the projecting head portion has the shaft pin penetrated through it and is formed circular at the upper surface thereof nearly along a circle whose center lies on the longitudinal axis of the shaft pin and smoothly contiguous to the upper surface of the top plate part;

the length of the top plate part in the conveying direction is set shorter than the chain pitch; and the top plate part has a lower slant face formed on the front edge thereof while having formed in the middle of the rear edge thereof a curved concavity with a concave slant face.

(2) Also, the chain for use in a three-dimensional conveyor line, according to the present invention comprises synthetic resin-made chain links endlessly connected together and of which two adjacent ones are hinged to each other by a shaft pin as set forth in claim 2, wherein:

each of the chain links includes a top plate part on which a product to be conveyed is placed, and a link part formed under the top plate part to hinge two adjacent chain links to each other;

the link part includes a head portion having a circular wall projecting frontward from the central front end of the top plate part and a pair of leg pieces projecting rearward from the right and left rear ends, separated from each other, of the top plate part;

the projecting head portion has pivotally installed inside the circular wall of the projecting head part a bearing block through which the shaft pin is penetrated;

the circular wall of the projecting head portion has formed in the lateral sides thereof holes elongated in the conveying direction and in which the shaft pin are loosely fitted;

the projecting head portion is formed circular at the upper surface thereof nearly along a circle whose center lies on the longitudinal axis of the shaft pin and smoothly contiguous to the upper surface of the top plate part;

the length of the top plate part in the conveying direction is set shorter than the chain pitch; and the top plate part has a lower slant face formed on the front edge thereof while having formed in the middle of the rear edge thereof a curved concavity with a concave slant face which matches the upper surface of the projecting head portion of the adjacent chain link.

(3) Also, the chain for use in a three-dimensional conveyor line, according to the present invention comprises synthetic resin-made chain links endlessly connected together and of which two adjacent ones are hinged to each other by a shaft pin as set forth in claim 3, wherein:

each of the chain links includes a top plate part on which a product to be conveyed is placed, and a link part formed under the top plate part to hinge two adjacent chain links to each other;

the link part includes a head portion projecting frontward from the central front end of the top plate part and a pair of leg pieces projecting rearward from the right and left rear ends, separated from each other, of the top plate part;

the projecting head portion has a shaft pin penetrated through it and is formed circular at the upper surface thereof nearly along a circle whose center lies on the longitudinal axis of the shaft pin and smoothly contiguous to the upper surface of the top plate part;

the top plate part has recesses formed in the front end portion thereof and projections formed at the rear end portion thereof correspondingly to the recesses to be received in the recesses when the chain links sway laterally; and the top plate part has a lower slant face formed on the middle rear edge thereof a curved concavity with a concave slant face which matches the upper surface of the projecting head portion of the adjacent chain link.

In any of the chains for three-dimensional conveyor line described in (1) to (3), the distance from the longitudinal axis of the shaft pin to the upper surface of the top plate part should desirably be set short and the step between the top plate part and top of the pair of leg pieces be set relatively large.

BEST MODE FOR CARRYING OUT THE INVENTION

With reference to the accompanying drawings, there will be described below embodiments of the chain for use in a three-dimensional conveyor line according to the present invention.

FIGS. 1 to 8 show together an embodiment of the conveyor chain according to the present invention. The chain for three-dimensional conveyor line according to the present invention is destined for use in a conveyor line constructed to three-dimensionally convey products such as beverages, foods, pharmaceuticals or the like, and includes synthetic resin-made chain links A endlessly connected together and of which two adjacent ones are hinged to each other by a synthetic resin-made bearing block B and metallic shaft pin C.

As shown, each of the chain links A includes a top plate part A2 having an upper side on which the product to be conveyed is placed, and a link part A1 formed on the lower surface of, and integrally with, the top plate part A2 to hinge two adjacent links A to each other.

The link part A1 includes a head portion 1 having a circular wall projecting downward from the lower surface, and also projecting frontward from the front center, of the top plate part A2, and a pair of leg pieces 2 projecting downward from the lower surface, and also projecting rearward from separate places at the rear end of the top plate part A2.

A bearing block B is pivotally inserted inside the circular wall of the projecting head portion 1 and a shaft pin C is penetrated through the bearing block B. The circular wall of the projecting head portion 1 has formed in either lateral side thereof a hole 3 elongated longitudinally of the chain link A so that the shaft pin C can be loosely fitted in the elongated holes 3. The upper surface of the projecting head portion 1 is circular nearly along a circle whose center lies on the longitudinal axis of the shaft pin C and smoothly contiguous to the upper surface of the top plate part A2 (as will be seen from FIG. 5). That is, even if an opening results between the adjacent top plate parts A2 when a product is conveyed obliquely or when the chain engages onto the sprocket, the projecting head portion 1 will not make any large step. Thus, it is possible to prevent the product from being thrust up, thus caught or overturned. Namely, the conveyor chain according to the present invention can convey products very smoothly.

Further, the top plate part A2 has a length in the conveying direction, set smaller than the chain pitch, so that the front and rear edges of the top plate part A2 will not thrust up the product during oblique conveyance or at the time of engagement of the chain onto the sprocket. In addition, the top plate part A2 is formed at the front edge thereof to have an upper slant face 10 and lower slant face 11 on either side of the projecting head portion 1, and at the rear right and left edges thereof to have a slant concavity 12 in which the front right and left edges of the top plate part A2 of the adjacent chain link A can be fitted (see FIGS. 1 to 7). Thus, mutual interference will not easily take place between the adjacent top plate parts A2 and the chain links A can be moved largely laterally in relation to each other, which assures a smooth conveyance of products.

The top plate part A2 is formed on the middle rear edge thereof, as a curved concavity 7 with a slant face 7a which is formed at the lower side to match the upper surface of the projecting head portion 1 of the adjacent chain link A. Namely, it is possible to prevent the product from being thrust up, thus caught or overturned by the upper surface of the projecting head portion 1, which also assures the smooth conveyance of products.

The distance from the longitudinal axis of the shaft pin C to the upper surface of the top plate part A2 is set short, so that the chain itself can be compact to meet the space saving requirements. Also, the geometry of the chain according to the present invention is so set that during oblique conveyance or at the time of engagement of the chain onto the sprocket, the top plate parts A2 of the adjacent chain links A will not form any large opening between them.

Figure 1:
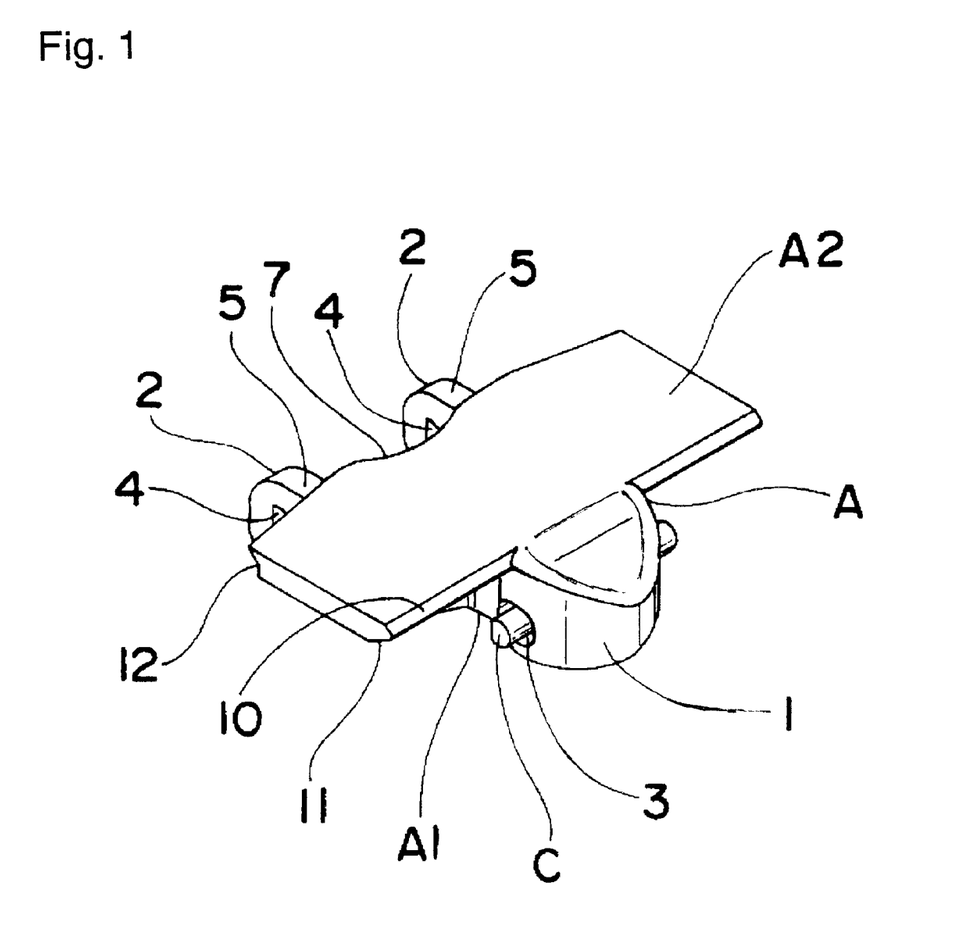
FIG. 1 is a perspective view of an embodiment of the chain according to the present invention.
Figure 2:
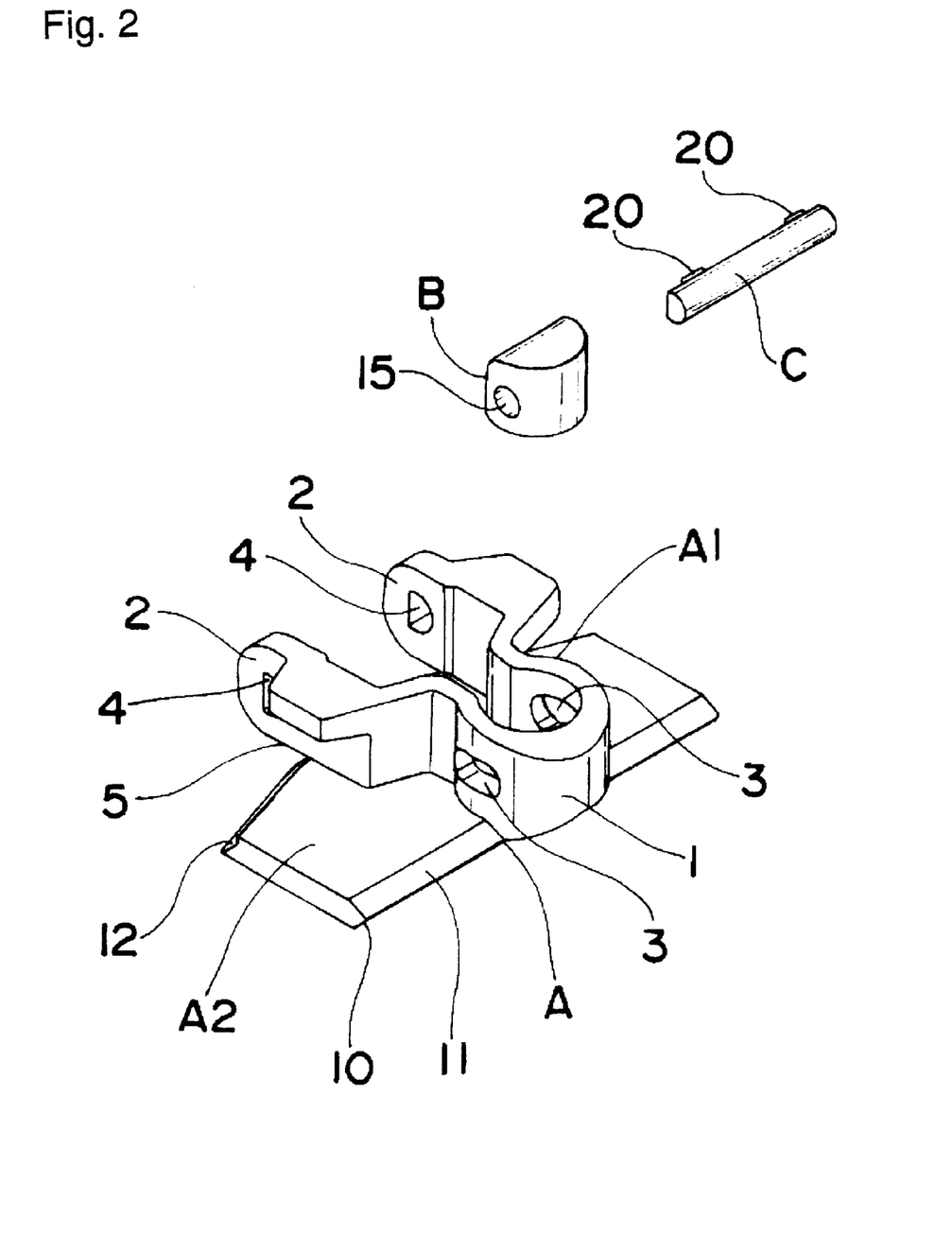
FIG. 2 is an exploded perspective view of the chain in FIG. 1.
Figure 3:
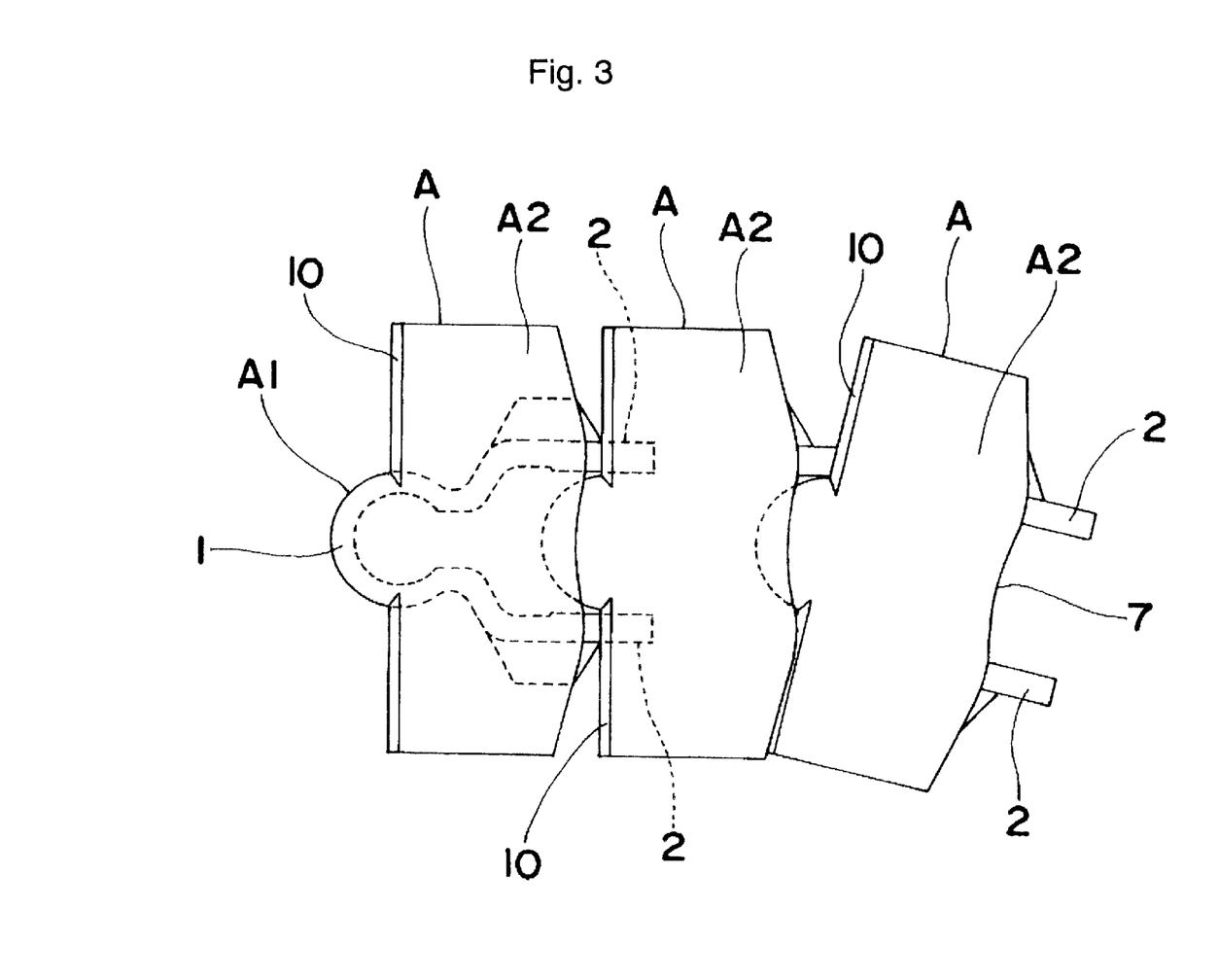
FIG. 3 is a plan view of the chain in FIG. 1.
Figure 4:
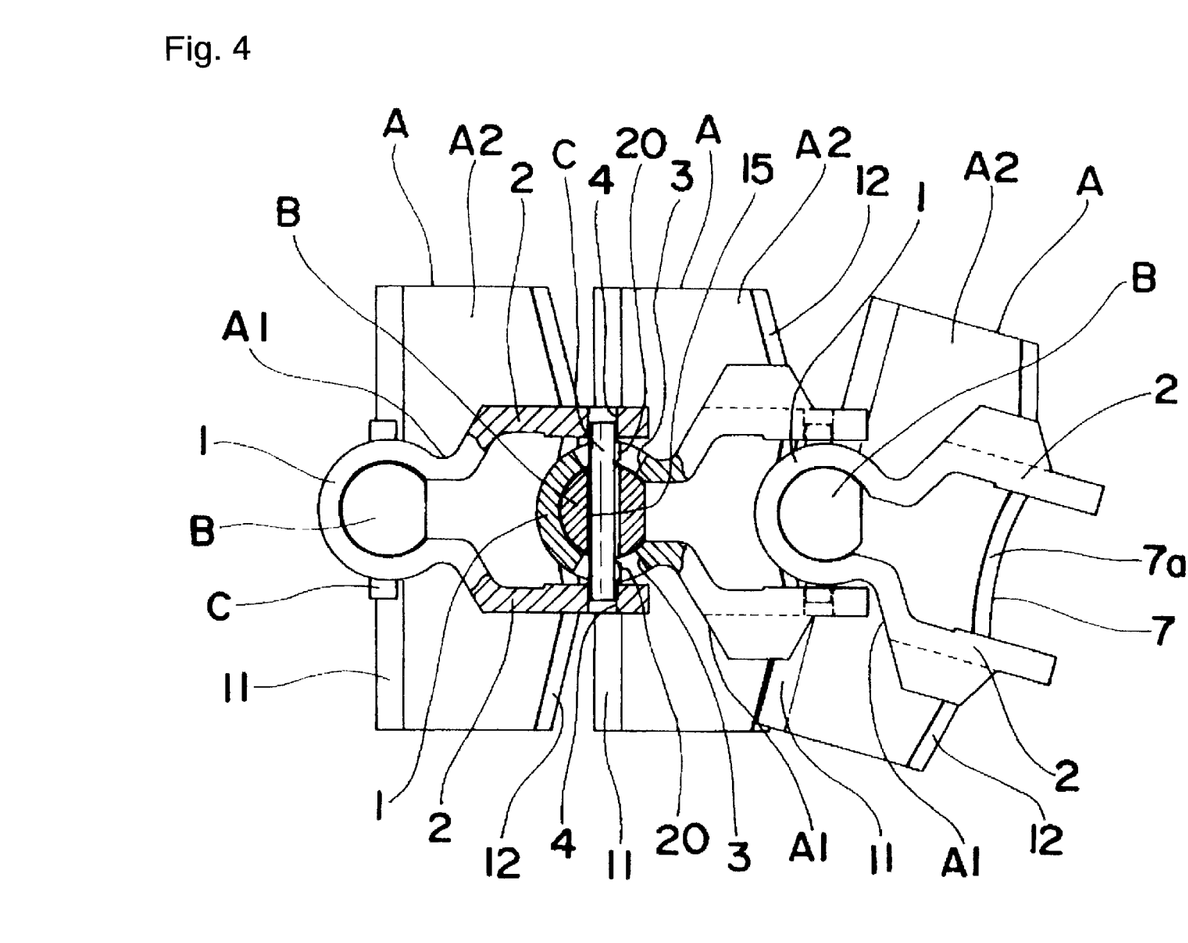
FIG. 4 is a partially fragmentary bottom view of the chain in FIG. 1.
Figure 5:
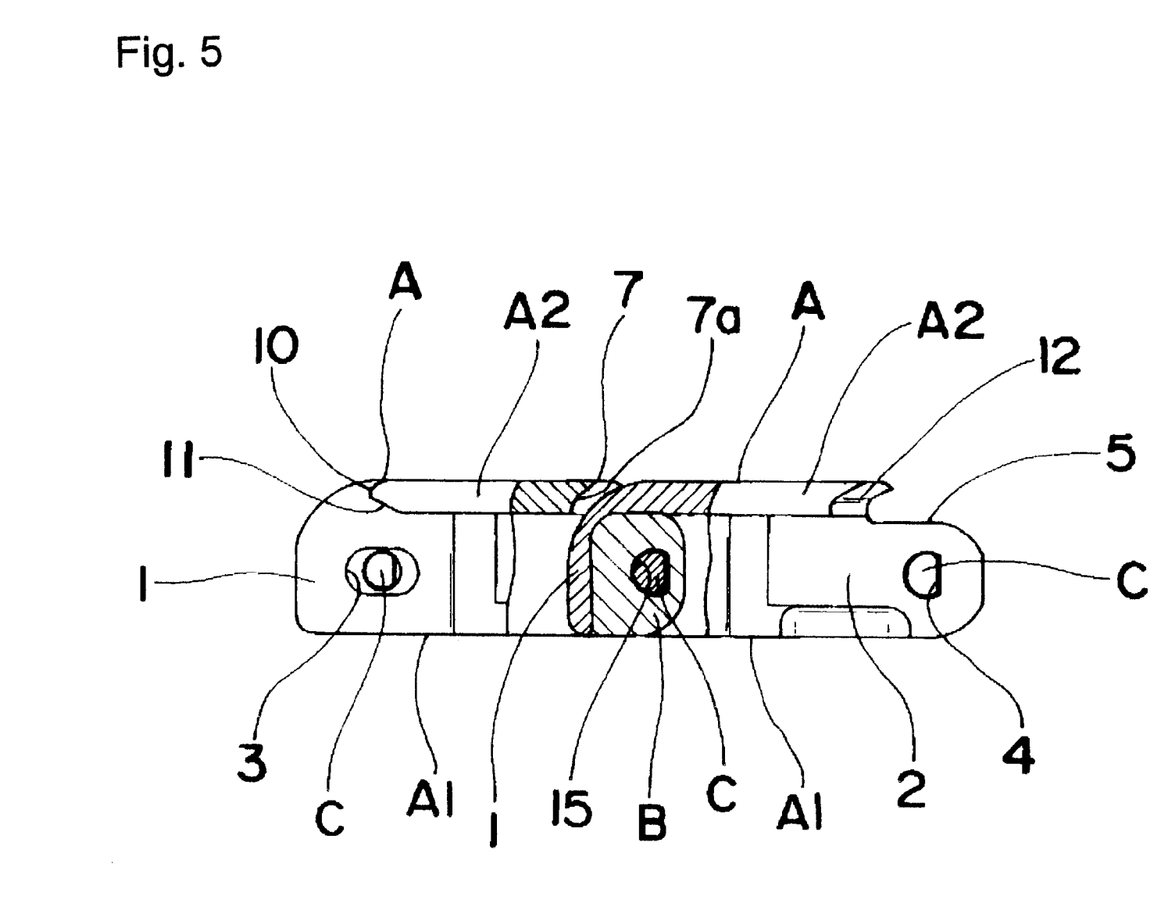
FIG. 5 is a partially fragmentary side elevation of the chain in FIG. 1.
Figure 6:
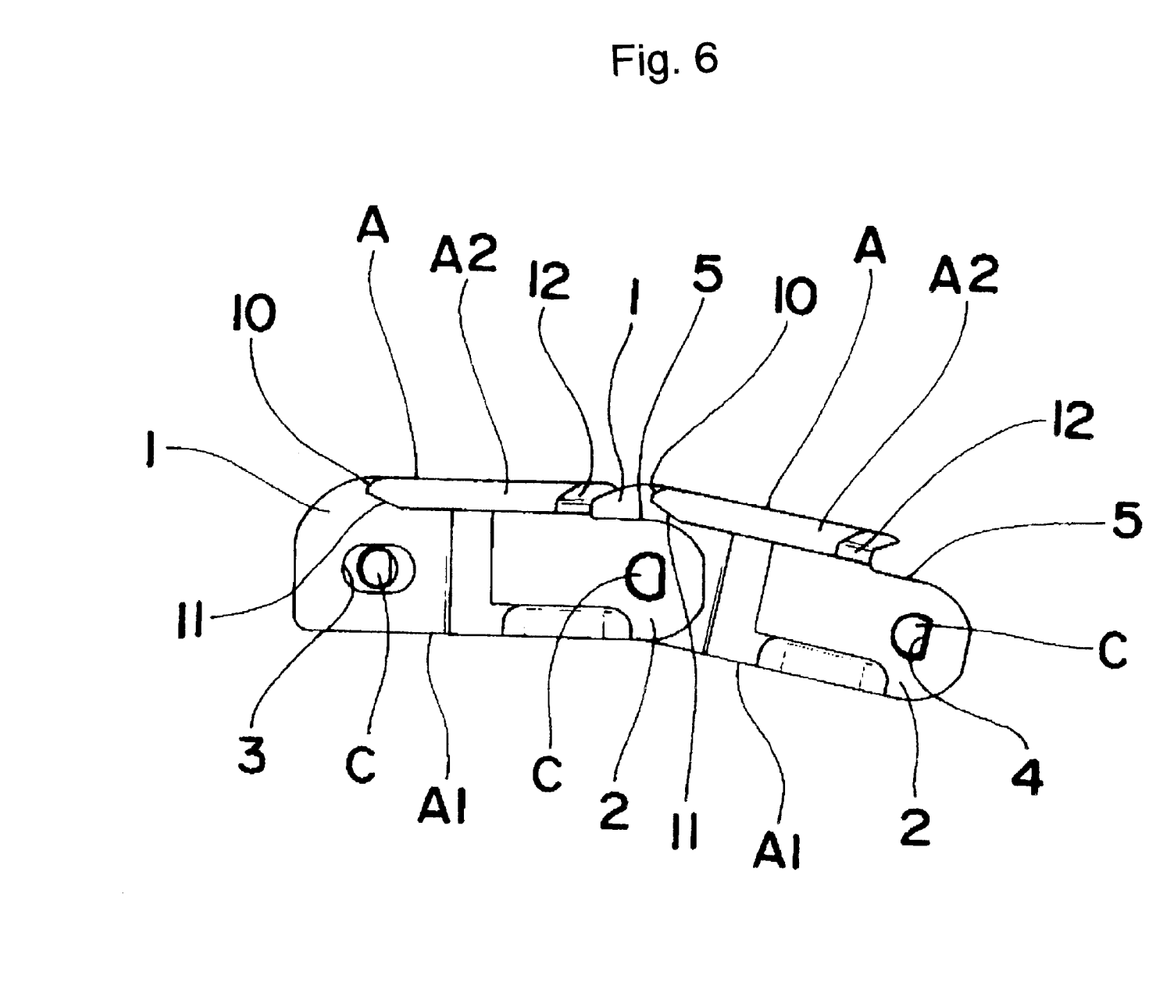
FIG. 6 is a side elevation of the chain in FIG. 1.
Figure 7:
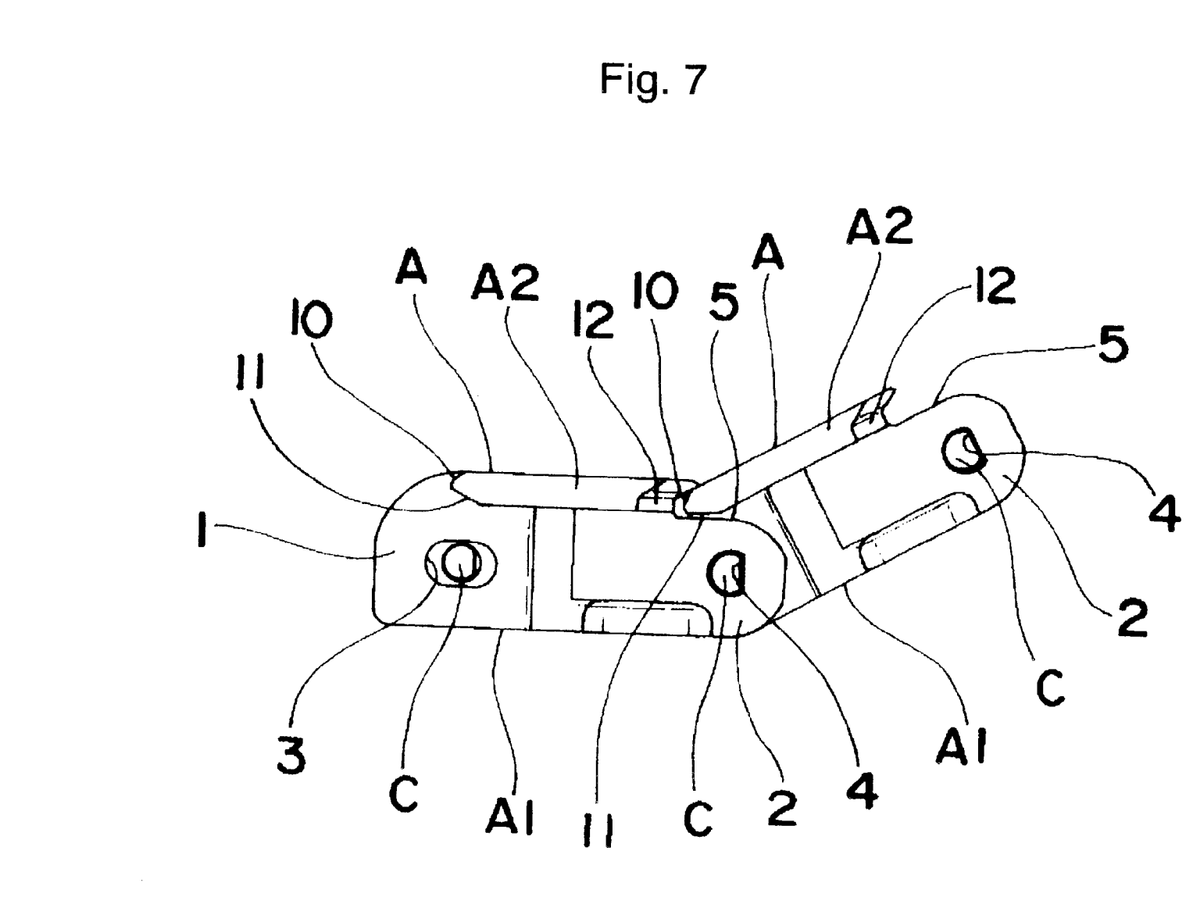
FIG. 7 is also a side elevation of the chain in FIG. 1.
Figure 8:
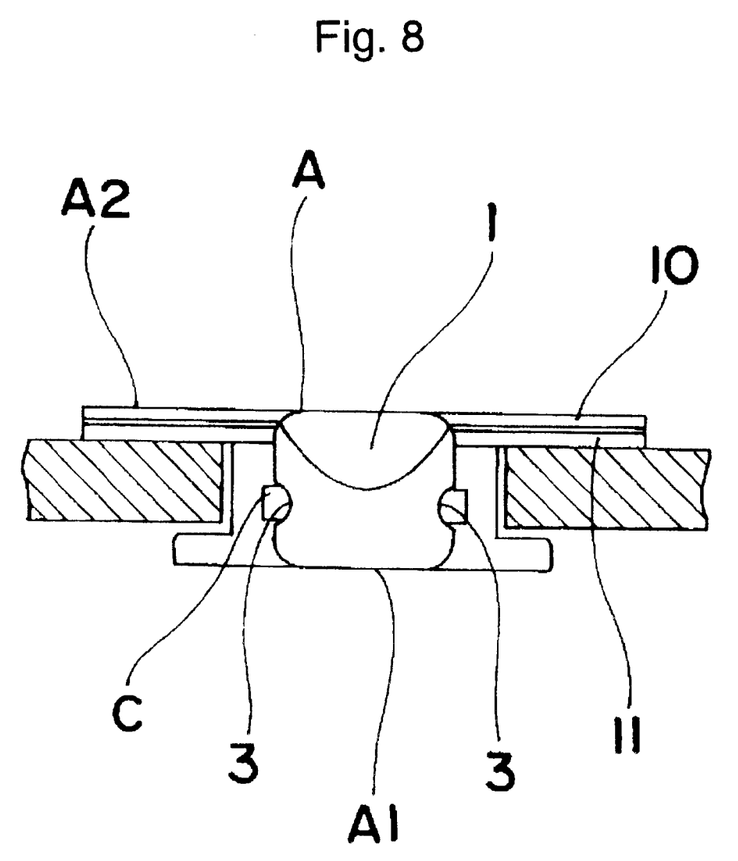
FIG. 8 is a front view of the chain in FIG. 1.

Further, a step defined between the upper surface of the top plate part A2 and a step 5 formed on the top of each of the pair of leg pieces 2, lower than the upper surface of the projecting head portion 1, is set so large that the front edge of the top plate part A2 of the chain link A will sink without interference with the pair of leg pieces 2 of the other chain link A when the chain is bent back, to thereby allow the chain to be bent back with a minimum radius of curvature (see FIG. 7).

It should be reminded here that the chain link A may be formed from the top plate part A2 and link part A1, which are formed integrally from a synthetic resin, alternatively, the chain link A may be built by forming the top plate part A2 and link part A1 separately from each other and fixing the former to the latter and that the construction, shape, dimensions and material of the chain can appropriately be selected within the range of an intended purpose.

The link part A1 is designed to hinge the chain links A to each other positively and simply. In the illustrated embodiment, the projecting head portion 1 being a circular wall having a generally C-like bottom shape is contiguously followed at either rear end thereof by the pair of leg pieces 2 disposed with such a space between them that the projecting head portion 1 can be fitted between them.

Note that the leg pieces 2 are designed lower than the projecting head portion 1 so that during oblique conveyance, the leg pieces 2 will not protrude largely from the projecting head portion 1 of the adjacent chain link A. The projecting head portion 1 is formed from the circular wall consisting of a front wall and lateral walls, and also from the upper circular wall. Namely, the projecting head portion 1 is open at the rear end and bottom thereof. The elongated holes 3 formed in the lateral sides of the projecting head portion 1 are designed to limit the moving range of the shaft pin C (swaying range of the chain) when the chain is swayed laterally.

It should be reminded here that the projecting head portion 1 is not limited to the aforementioned one consisting of the front and side circular walls but may be a one which could assure a positive and smooth hinging between two adjacent chain links A.

Also, the pair of leg pieces 2 of the chain part A1 has formed in the rear ends thereof insertion holes 4 in which the shaft pin C is inserted and held at the opposite ends thereof.

As mentioned above, the step 5 is formed on the top of the end edge of each leg piece 2. The step 5 is lower than the lower slant face 11 of the top plate part A2. The step 5 is formed so that the lower slant face 11 of the top plate part A2 can be in close contact with the top 5. That is to say, When the chain is bent back, the front edge of the top plate part A2 can sink owing to the design of the leg pieces 2.

Note that the construction, shape, dimensions and material of the link part A1, construction, shape and dimensions of the projecting head portion 1, construction, shape and dimensions of the leg pieces 2, shape, dimensions and location of the elongated holes 3, shape, dimensions and location of the insertion holes 4, and the shape and dimensions of the step 5 are not limited to those specified above for, this embodiment but can appropriately be selected and set within the range of an intended purpose.

As in FIGS. 1 to 8, the top plate part A2 is generally flat. The front edge of the top plate part A2 is formed perpendicular to the moving direction of the chain as viewed in a plane while the central portion of the rear edge is formed as the curve 7 concave as viewed in the plane. The portions of the rear edge to the right and left of the curved concavity 7 are formed little by little narrower as they go towards their respective right and left ends. Namely, the edge lines of the right and left portions are inclined a little towards the front edge of the top plate part A2 as viewed from above. The upper slant face 10 is formed at the upper side of each of the front right and left edges while the lower slant face 11 is formed at the lower side. Namely, each of the front right and left edges of the top plate part 2A is projected generally like a letter "L" as viewed from the lateral end.

As having previously been described, the top plate part A2 is formed, at the central lower side of the rear edge thereof, to have the slant face 7a which is to match the curve of the upper surface of the projecting head portion 1 of the adjacent chain link A. Also the top plate part A2 is formed at the edge portions thereof to the right and left of the central portion to have the slant concavity 12 concave generally like a letter "L" as viewed from the free lateral end, of the top plate part A.

Figure 9:
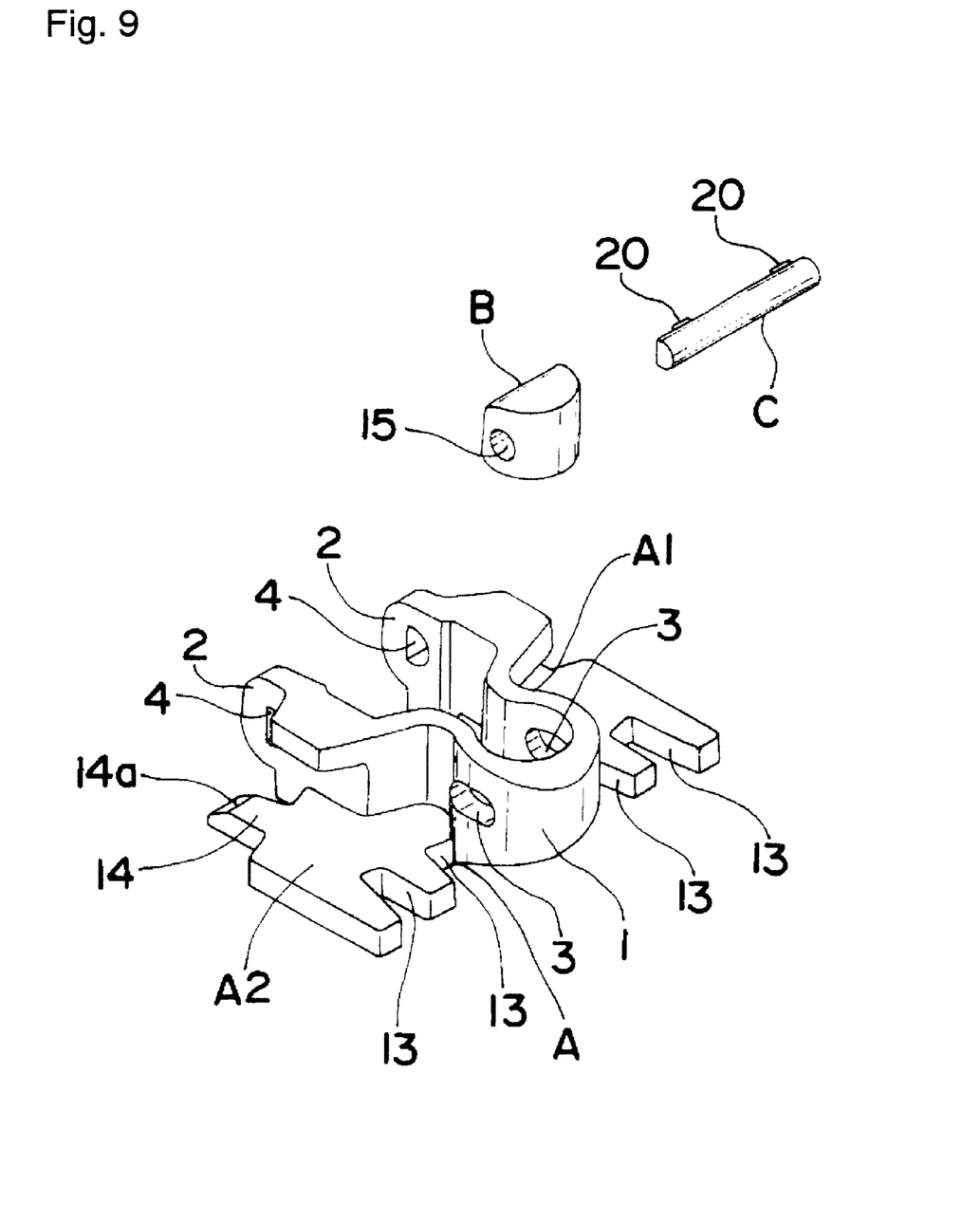
FIG. 9 is an exploded view of another embodiment of the chain according to the present invention.
Figure 10:
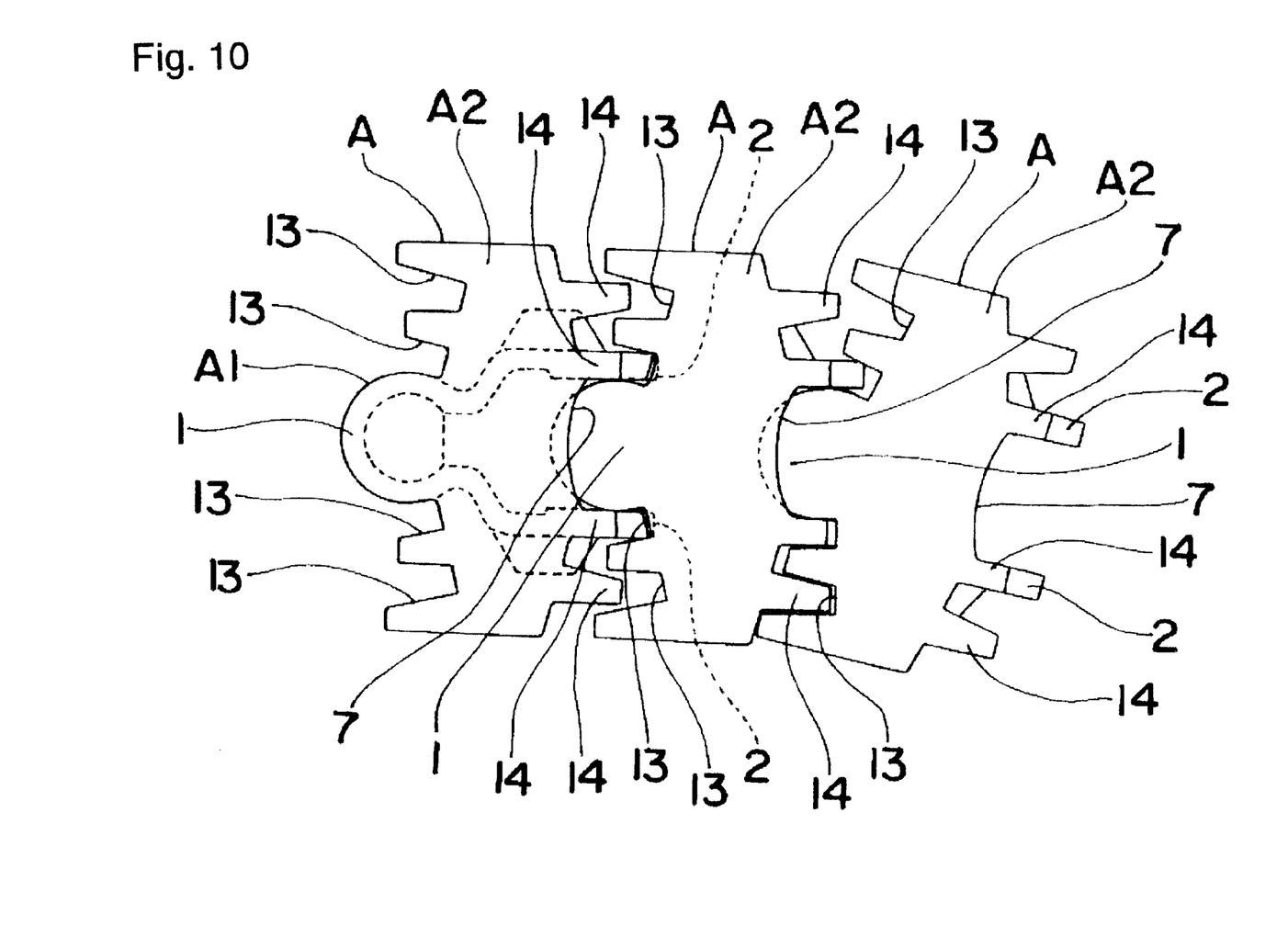
FIG. 10 is a plan view of the chain in FIG. 9.
Figure 11:
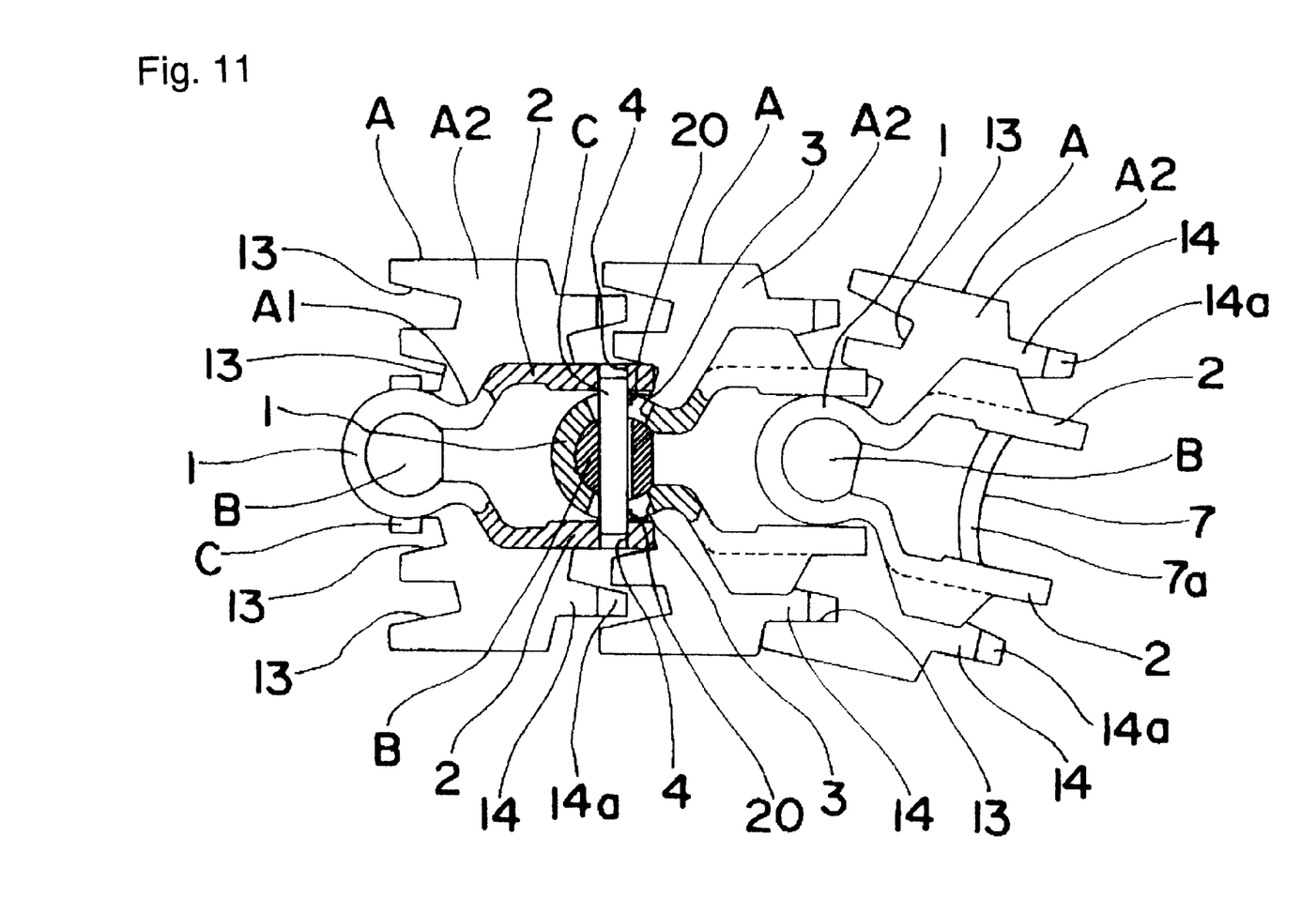
FIG. 11 is a bottom view of the chain in FIG. 9.

FIGS. 9 to 11 show together another embodiment of the conveyor chain according to the present invention. In FIGS. 9 to 11, the same or similar parts or portions of the conveyor chain as or to those in the aforementioned first embodiment are indicated with the same or similar references as those in FIGS. 1 to 8. The top plate part A2 of this conveyor chain is generally flat. The central portion of the rear edge of the top plate part A2 is formed as the curved concavity 7 as viewed in a plane. The portions of the top plate part A2 to the right and left of the curved concavity 7 are formed little by little narrower as they go towards their respective free lateral ends. Namely, the edge lines of the right and left portions are inclined a little towards the front edge of the top plate part A2 as viewed from above. Further, each of the right and left front edge portions of the top plate part A2 has a suitable number of recesses 13 formed therein while each of the right and left rear edge portions of the top plate part A2 has formed thereon projections 14 corresponding to the recesses 13.

Thus, when the chain links A are swayed laterally about the projecting head portion 1, the projections 14 can be received in the recesses 13 without interference with the latter. The projection 14 has a lower slant face 14a formed on the rear edge thereof. Further, the top plate part A2 has formed on the central lower surface of the rear edge thereof a concave slant face 7a which matches the bending of the upper surface of the projecting head portion 1.

Depending upon the number, dimensions, shape and location of the recesses 13 and projections 14, the length of the top plate part A2 in the conveying direction may be set shorter than the chain pitch.

Note that the construction, shape, dimensions and material of the top plate part A2, shape and dimensions of the curved concavity 7, shape and dimensions of the concave slant face 7a, shape, dimensions, location and existence/absence of the upper slant face 10, shape, dimensions, location of the lower slant face 11, shape, dimensions, location and presence/absence of the slant concavity 12, construction, shape, dimensions, location and number of the recesses 13, construction, shape, dimensions, location and number of the projections 14, and shape and dimensions of the lower slat faces 14a are not limited to those shown in FIGS. 9 to 11 but may be selected and set within the range of an intended purpose.

The bearing block B is formed generally cylindrical so that it can be inserted in the circular wall of the projecting head portion 1 and smoothly turned laterally in the projecting head portion 1. The bearing block B has formed in the middle thereof a round insertion hole 15 through which the shaft pin C can be penetrated.

Note that the bearing block b may not always be provided in the chain according to the present invention and the construction, shape, dimensions and material of the bearing block B are not limited to those described in the above but may appropriately be selected and set within the range of an intended purpose.

Further, the shaft pin C is formed as a cylinder whose rear half is generally flat. On the flat side of the shaft pin C, there are provided near the right and left ends thereof, respectively, retention projections 20 which abut the inner surface of the pair of leg pieces 2 to block the shaft pin C from coming out of the fitting holes 4 formed in the leg pieces 2.

Note that the construction, shape, dimensions and material of the shaft pin C and the construction, shape, dimensions and location of the retention projections 20 are not limited to those described in the above but may appropriately be set within the range of an intended purpose.

Therefore, in the conveyor chain for three-dimensional conveyor line as set forth in claim 1, since the length of the top plate part A2 in the conveying direction is set shorter than the chain pitch, the front or rear edges of the top plate part A2 will not thrust up the product during oblique conveyance or at the time of engagement of the chain onto the sprocket.

Further, the lower slant face 11 formed on the front edge of the top plate part A2 allows the front edge of the top plate part A2 of the chain link to sink to the pair of leg pieces 2 of the adjacent chain link and make the radius of curvature of the chain, when the chain is bent back. Also, the chain itself is simply constructed, easy to manufacture, suitable for mass production, highly durable and more inexpensive.

More specifically, the upper surface of the projecting head portion 1 projected frontward from the front central portion of the lower surface of the top plate part A2 is circular nearly along a circle whose center lies on the longitudinal axis of the shaft pin C and smoothly contiguous to the upper surface of the top plate part, and the curved concavity 7 with a concave slant face 7a is formed in the middle of the rear edge of the top plate part A2. That is, even if an opening results between the top plate parts A2 of two adjacent chain links A when a product is conveyed obliquely or when the chain engages onto the sprocket, the projecting head portion 1 will not make any large step.

Thus, it is possible to prevent the product from being thrust up, thus caught or overturned. Namely, the conveyor chain according to the present invention can convey products very smoothly.

Also, in the conveyor chain for three-dimensional conveyor line as set forth in claim 2, since the length of the top plate part A2 in the conveying direction is set shorter than the chain pitch, the front or rear edges of the top plate part A2 will not thrust up the product during oblique conveyance or at the time of engagement of the chain onto the sprocket.

Further, the lower slant face 11 formed on the front edge of the top plate part A2 allows the front edge of the top plate part A2 of the chain link to sink to the pair of leg pieces 2 of the adjacent chain link and make the radius of curvature of the chain smaller, when the chain is bent back. Also, the chain itself is simply constructed, easy to manufacture, suitable for mass production, highly durable and more inexpensive.

More specifically, the upper surface of the projecting head portion 1 having the circular wall projected frontward from the front central portion of the lower surface of the top plate part A2 is circular nearly along a circle whose center lies on the longitudinal axis of the shaft pin C and smoothly contiguous to the upper surface of the top plate part, and the curved concavity 7 with a concave slant face 7a which fits the top of the projecting head portion 1 of the adjacent chain link A is formed in the middle rear edge of the top plate part A2.

That is, even if an opening is made between the adjacent top plate parts A2 when a product is conveyed obliquely or when the chain engages onto the sprocket, the projecting head portion 1 will not make any large step. Thus, it is possible to prevent the product from being thrust up, thus caught or overturned. Namely, the conveyor chain according to the present invention can convey products very smoothly.

Also, in the conveyor chain for three-dimensional conveyor line as set forth in claim 3, the top plate part A2 has a suitable number of recesses 13 formed in the front edge portions thereof while the top plate part A2 has provided at the rear edge portions thereof projections 14 corresponding to the recesses 13, so that when the chain links A are swayed laterally, the projections 14 can be received in the recesses 13.

Even if the chain links A are greatly swayed laterally, there will take place no large gap between the adjacent top plate parts A2 and thus the product being conveyed will not be caught or overturned. Namely, the product can be conveyed more safely. Also, the chain itself is simply constructed, easy to manufacture, suitable for mass production, highly durable and more inexpensive.

More specifically, the upper surface of the projecting head portion 1 having the circular wall projected frontward from the front central portion of the lower surface of the top plate part A2 is circular nearly along a circle whose center lies on the longitudinal axis of the shaft pin C and smoothly contiguous to the upper surface of the top plate part A2, and the curved concavity 7 with a concave slant face 7a which fits the upper surface of the projecting head portion 1 of the adjacent chain link A is formed in the middle of the rear edge of the top plate part A2.

That is, even if an opening results between the adjacent top plate parts A2 when a product is conveyed obliquely or when the chain engages onto the sprocket, the projecting head portion 1 will not make any large step. Thus, it is possible to prevent the product from being thrust up, thus caught or overturned. Namely, the conveyor chain according to the present invention can convey products very smoothly.

In the conveyor chain for three-dimensional conveyor line as set forth in claim 4, since the distance from the longitudinal axis of the shaft pin C to the upper surface of the top plate part A2 is set short and the step between the upper surface of the top plate part A2 and the top of the pair of leg pieces 2 is set relatively large, so the chain itself can be compact to meet the space saving requirements.

Also, the geometry of the chain is so set that during oblique conveyance or at the time of engagement of the chain onto the sprocket, the top plate parts A2 of the adjacent chain links A will not form any large opening between them. Further, the step defined between the upper surface of the top plate part A2 and that of a step 5 on the top of each of the pair of leg pieces 2, lower than the upper surface of the projecting head portion 1, is set so large that the front edge of the top plate part A2 of the chain link A will sink without interference with the pair of leg pieces 2 of the other chain link A when the chain is bent back, to thereby allow the chain to be bent back with a minimum radius of curvature.

INDUSTRIAL APPLICABILITY

As having been described in the foregoing, the chain for three-dimensional conveyor line according to the present invention has solved the technical problems of the prior art such as overturning of the product due to thrust-up by the front or rear edges of the chain link or catching of the product at a large step resulted between the conveying surfaces of the two adjacent chain links, which will take place during oblique conveyance or engagement of the chain on the sprocket.

The conveyor chain according to the present invention has a relative wide conveying surface for smooth conveyance of products, and is easy to manufacture, suitable for mass production and highly durable. Namely, the present invention provides a conveyor chain suitable for three-dimensional conveyance of beverages, foods, pharmaceuticals or other products.

What is claimed is:

1. A chain for use in a three-dimensional conveyor line, comprising synthetic resin-made chain links endlessly connected together and of which two adjacent ones are hinged to each other by a shaft pin, wherein:

each of the chain links includes a top plate part on which a product to be conveyed is placed, and a link part formed at the lower side of the top plate part to hinge two adjacent chain links to each other;

the link part includes a head portion projecting frontward from the central front end of the top plate part and a pair of leg pieces projecting rearward from the right and left rear ends, separated from each other, of the top plate part;

the projecting head portion has the shaft pin penetrated through it and is formed circular at the upper surface thereof nearly along a circle whose center lies on the longitudinal axis of the shaft pin and smoothly contiguous to the upper surface of the top plate part;

the length of the top plate part in the conveying direction is set shorter than the chain pitch; and the top plate part has a lower slant face formed on the front edge thereof while having formed in the middle rear edge thereof a curved concavity with a concave slant face.

2. A chain for use in a three-dimensional conveyor line, comprising synthetic resin-made chain links endlessly connected together and of which two adjacent ones are hinged to each other by a shaft pin, wherein:

each of the chain links includes a top plate part on which a product to be conveyed is placed, and a link part formed at the lower side of the top plate part to hinge adjacent chain links to each other;

the link part includes a head portion having a circular wall projecting frontward from the central front end of the top plate part and a pair of leg pieces projecting rearward from the right and left rear ends, separated from each other, of the top plate part;

the projecting head portion has pivotally installed inside the circular wall of the projecting head part a bearing block through which the shaft pin is penetrated;

the circular wall of the projecting head portion has formed in the lateral sides thereof holes elongated in the conveying direction and in which the shaft pin are loosely fitted;

the projecting head portion is formed circular at the upper surface thereof nearly along a circle whose center lies on the longitudinal axis of the shaft pin and smoothly contiguous to the upper surface of the top plate part;

the length of the top plate part in the conveying direction is set shorter than the chain pitch; and the top plate part has a lower slant face formed on the middle rear edge thereof a curved concavity with a concave slant face which matches the upper surface of the projecting head portion of the adjacent chain link.

3. A chain for use in a three-dimensional conveyor line, comprising synthetic resin-made chain links endlessly connected together and of which two adjacent ones are hinged to each other by a shaft pin, wherein:

each of the chain links includes a top plate part on which a product to be conveyed is placed, and a link part formed at the lower side of the top plate part to hinge adjacent chain links to each other;

the link part includes a head portion projecting frontward from the central front end of the top plate part and a pair of leg pieces projecting rearward from the right and left rear ends, separated from each other, of the top plate part;

the projecting head portion has the shaft pin penetrated through it and is formed circular at the upper surface thereof nearly along a circle whose center lies on the longitudinal axis of the shaft pin and smoothly contiguous to the upper surface of the top plate part;

the top plate part has recesses formed in the front end portion thereof and projections formed at the rear end portion thereof correspondingly to the recesses to be received in the recesses when the chain links sway laterally; and the top plate part has a lower slant face formed on the middle rear edge thereof a curved concavity with a concave slant face which matches the upper surface of the projecting head portion of the adjacent chain link.

4. The chain according to claim 2, wherein: the distance from the longitudinal axis of the shaft pin to the upper surface of the top plate is set short; and the step between the top plate part and top of the pair of leg pieces is set relatively large.

5. The chain according to claim 3, wherein: the distance from the longitudinal axis of the shaft pin to the upper surface of the top plate is set short; and the step between the top plate part and top of the pair of leg pieces is set relatively large.

* * * * *